(12) United States Patent
Anderson

(10) Patent No.: US 6,674,475 B1
(45) Date of Patent: Jan. 6, 2004

(54) METHOD AND CIRCUIT FOR ELECTRONIC SHUTTER CONTROL

(75) Inventor: Mark A Anderson, Ft Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/370,451

(22) Filed: Aug. 9, 1999

(51) Int. Cl.⁷ .......................... H04N 5/335; H04N 5/238
(52) U.S. Cl. ....................................... 348/367; 348/294
(58) Field of Search ........................... 348/222.1, 229.1, 348/294, 296, 297, 362, 363, 364, 367

(56) References Cited

U.S. PATENT DOCUMENTS

| | | | |
|---|---|---|---|
| 4,516,172 A | * 5/1985 | Miyata et al. | 348/229.1 |
| 4,843,476 A | * 6/1989 | Fujioka et al. | 348/229.1 |
| 5,448,293 A | * 9/1995 | Kogane et al. | 348/229.1 |
| 5,579,049 A | * 11/1996 | Shimaya et al. | 348/364 |
| 5,589,880 A | * 12/1996 | Tsukui | 348/229.1 |
| 5,799,216 A | 8/1998 | Teremy et al. | 396/225 |
| 5,837,987 A | 11/1998 | Koenck et al. | 235/462 |
| 5,841,121 A | 11/1998 | Koenck et al. | 235/472 |
| 5,854,482 A | 12/1998 | Bidiville et al. | 250/221 |
| 6,512,791 B1 | * 1/2003 | Takayama | 348/364 |

* cited by examiner

Primary Examiner—Wendy R. Garber
Assistant Examiner—Rashawn N. Tillery

(57) ABSTRACT

An improved method and apparatus for controlling the shutter open time in an opto-electronic device is presented. A frame of pixel intensity data is collected and the average pixel intensity value is across said frame is calculated and compared to a first threshold. If the average pixel intensity is outside a first intensity range defined by said first threshold, the shutter open time is adjusted in a first direction. Otherwise, the peak pixel intensity value across the frame is found and compared to a second threshold. If the peak pixel intensity value is outside a second intensity range defined by said second threshold, the shutter open time is adjusted in said first direction. If the peak pixel intensity value is not outside a second intensity range, the peak pixel intensity value is compared to a third threshold. If the peak pixel intensity value is outside a third intensity range defined by the third threshold, the shutter open time is adjusted in a second direction.

20 Claims, 5 Drawing Sheets

METHOD AND CIRCUIT FOR ELECTRONIC SHUTTER CONTROL

FIELD OF THE INVENTION

The present invention pertains generally to opto-electronics, and more particularly, to a method and circuit that controls the effective light level in a photodetector array by use of an electronic shutter.

BACKGROUND OF THE INVENTION

Photo-detector arrays are used in many opto-electronic devices that involve imaging applications. One common application is known as an optical mouse, which is used in conjunction with a computer display to assist in navigation and capturing user input.

The typical optical mouse includes an illumination LED and a lens. An electronic shutter is controlled electronically to allow or disallow light from entering the photodetector array. A shutter control circuit monitors the light intensity across the photodetector array to determine and control the amount of allowed exposure time seen by the array. FIG. 1 illustrates a typical imaging application which employs an opto-electronic device 10. As illustrated, device 10 includes a photodetector array 2 positioned in the image plane of an optic lens 4. An illumination source 6 illuminates an image 12 positioned in the focal range of the image plane of optic lens 4. Light from the image passes through lens 4 and is sensed by the individual photodetectors in the photodetector array 2. Light reaching the photodetectors is controlled by the length of time a shutter 8 is open. In opto-electronic devices, the photodetector exposure is controlled electronically. For example, device 10 includes a shutter control circuit 14 which processes the light intensity level sensed by the individual photodetectors in the photodetector array 2 to determine an appropriate length of time in which the shutter should be open in order to produce the appropriate amount of exposure, and controls the opening and closing of the shutter in accordance with the determined amount of shutter open time.

The advantages of automatic shutter control are somewhat self-evident, and include the fact that no user intervention is required to set an appropriate shutter speed, and that the calculation and setting of the shutter speed electronically is much faster than a user could do the same, to name only a few. In many applications, the automatic adjustment of shutter speed is critical in facilitating high-rate collection of multiple image frames, as is necessary in the optical mouse example. Thus, it is quite clear that automated electronic shutter speed control is desirable, and quite often necessary, in many of today's imaging applications.

However, the technique used in prior art shutter control circuits is problematic in certain situations. Prior art shutter control circuits typically only attempt to keep the peak light level within a predetermined optimal range so as to obtain the best signal-to-noise ratio and best image quality. Because the shutter is controlled based only upon the peak light level, certain types of images are often not properly detected. For example, when attempting to optically navigate on a shiny black surface (e.g. Lycra or Spandex), an example of which is illustrated in FIG. 2, the photodetector array typically senses only a small few very bright pixels 20 where the illumination source is directly reflected into the photodetector array. Bright pixels are darkened in this illustration. The individual photodetectors in the photodetector array sense the light level on their corresponding pixel of the true image and generate a voltage level in proportion to the sensed light level. The output from the individual photodetectors is converted into digital format and concatenated into a stream 25 of pixel intensity data. A peak detector (not shown) processes the pixel intensity stream 25 frame by frame, detects whether any of the pixels are above a maximum allowed intensity level $V_{HIGH}$, and decreases the amount of time the shutter is open if any of the pixels is above the threshold $V_{HIGH}$. Accordingly, in the image example of FIG. 2, the pixel intensity stream 25 for a single frame, as illustrated in FIG. 3A will remain very close to the lower threshold $V_{MIN}$ except for the few very bright pixels 20, which will peak near the maximum allowed intensity level threshold $V_{HIGH}$. Because the shutter 8 in prior art shutter control circuits 14 is controlled based only upon the peak light intensity level, the exposure time will be decreased based on these few bright pixels 20 rather than the intensity level of the image as a whole. Accordingly, the shutter open time, as illustrated in FIG. 4, will be decreased.

In an ideal photodetector array, the full range of intensity levels for the entire image will fall within the lower and upper threshold limits $V_{MIN}$ and $V_{HIGH}$. Accordingly, if the peak detector detects a pixel intensity level outside this range, the exposure time must be adjusted to place the image completely within the range. Thus, when the most part of the information generally occupies intensity levels far lower than the maximum intensity level, but a few very bright pixels are detected due to the reflective surface of the image, because the exposure time is adjusted to scale the entire image including the very bright pixels within the full intensity range of the image processing circuitry as illustrated in FIG. 5A, the remainder of the image will be seen as mostly black. Accordingly, the optical device 10 is essentially "blinded", and if the remainder of the image contains information, the information will be very difficult, if not impossible, to detect.

Accordingly, a need exists for an improved method and apparatus for adjusting the amount of exposure time via the amount of shutter open time.

SUMMARY OF THE INVENTION

The present invention is a novel method and circuit that controls the effective light level in a photodetector array (PA) by use of an electronic shutter. The circuit uses average and peak light level data to determine the electronic shutter time necessary for controlling the light level of the PA.

In accordance with the invention, the average and peak light levels are monitored using an illumination source and lens. If the average light level is below a first threshold, the shutter open time is increased. Otherwise, if the peak light level is below a second threshold, the shutter open time is increased; if the peak light level is above a third threshold, the shutter open time is decreased; otherwise, the shutter open time is not adjusted. In other words, using the shutter open time to control the light level, the control circuit attempts to keep the average light level above the first threshold. If the average light level is above the first threshold, then the peak value is maintained between the second and third thresholds. Accordingly, using the average light level in the feedback loop, very bright pixels are ignored, and the shutter is set open long enough to allow the remainder of the image to be visible to the photodetector array, resulting in more texture to be used with correlation navigation.

In one embodiment, a shutter control circuit receives a pixel stream containing serialized pixel intensity data that was detected by a photodetector array and converted to digital form. The serialized pixel intensity data for one entire frame is input to an average accumulator, which calculates the average intensity over the entire image frame. The average intensity is compared to a minimum average threshold level, generating an average threshold signal which indicates whether the average frame intensity is below the minimum average threshold level. If so, control logic increases the pulse length of the enable shutter line which controls the amount of shutter open time. Simultaneously, the serialized pixel intensity data is also input to a peak detector, which determines whether any of the pixels were above a maximum allowed peak intensity level over the entire image frame. The output of the peak detector is input to a comparator circuit which then compares the peak intensity to a minimum peak threshold and a maximum peak threshold. If the peak intensity is below the minimum peak threshold, control logic increases the pulse length of the enable shutter line which controls the amount of shutter open time. If the peak intensity is above the maximum peak threshold, control logic decreases the pulse length of the shutter enable control line. When the peak intensity is neither below the minimum peak intensity nor above the maximum peak intensity, the pulse length of the shutter enable control line remains the same.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method and apparatus for controlling the exposure time of a photodetector array in an optical device via the use of both average and peak pixel intensity data is described in detail hereinafter. Although the invention is described herein in the context of an optical mouse, it will be appreciate by those skilled in the art that the inventive principles of the invention extend to any opto-electronic device with electronic shutter control without limitation.

Figure 6:
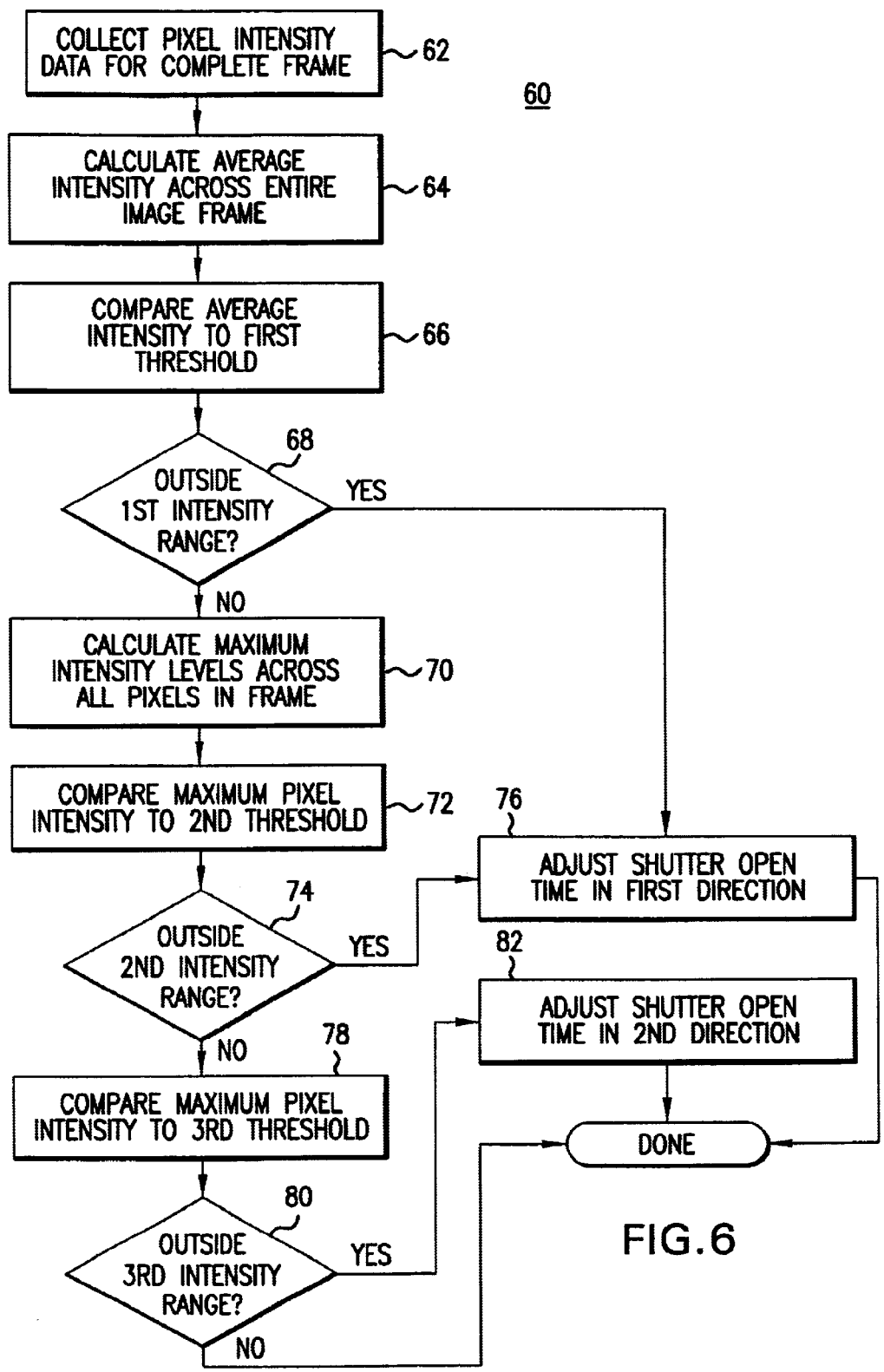
FIG. 6 is a flowchart illustrating the method of the invention.

Turning now to FIG. 6, there is illustrated an operational flowchart of a preferred method of the invention. The method is preferably implemented by electronic shutter control circuitry, but may be performed equally well in software, or in a combination of both hardware and software. As illustrated in FIG. 6, the method 60 begins with the collection 62 of pixel intensity data to form a complete image frame. Preferably, the pixel intensity data comprises a digital representation of the pixel intensity value for each pixel in an image frame. The average intensity is calculated 64 over all of the pixels in the image frame and compared 66 to a first threshold value. In the illustrative embodiment, the first threshold value is set to the minimum allowed average intensity value desired and appropriate to the particular application at hand. A determination is made as to whether the actual average intensity value is outside a first intensity range defined by the first threshold value. In the illustrative embodiment, the first intensity range is defined to be any value "below" the minimum allowed average intensity value. However, depending on the implementation, the first intensity range could also be defined to be "above" the first threshold value, and, as known by those skilled in the art, could also be defined to include the actual first threshold value itself. If it is determined that the actual average intensity value is outside the first intensity range as defined by the first threshold value, the shutter open time is adjusted 76 in a first direction. In the illustrative example, the first direction is an increase in shutter open time. That is, if the actual average intensity value is below the minimum allowed average intensity value, the shutter open time is increased in order to increase the overall exposure time.

If it is determined in step 68 that the actual average intensity value is not outside the first intensity range, then peak detection is performed. The maximum, or "peak", intensity values over the entire image frame is obtained 70. The maximum peak intensity value is compared 72 to a second threshold. If it is determined 74 that the maximum peak intensity value is outside a second intensity range defined by the second threshold, the shutter open time is adjusted 76 in the first direction.

If the maximum peak intensity value is not outside the second intensity range as defined by the second threshold, the maximum peak intensity value is compared 78 to a third threshold. If it is determined 80 that the maximum peak intensity value is outside a third intensity range defined by the third threshold, the shutter open time is adjusted 82 in a second direction away from the first direction.

Figure 7:
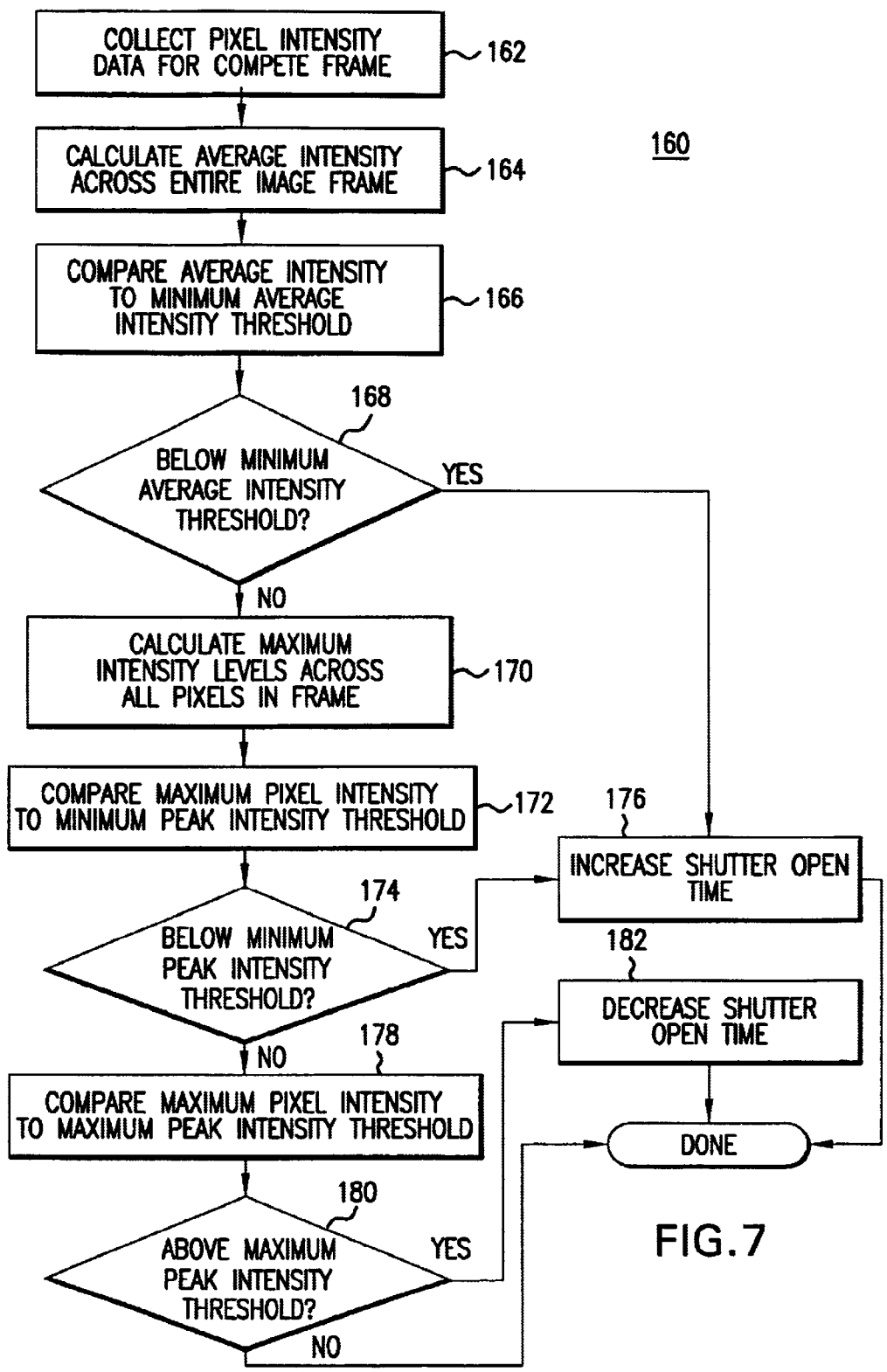
FIG. 7 is a flowchart illustrating an example embodiment of a method implemented in accordance with the invention.

FIG. 7 is an operational flowchart illustrating an example method implemented in accordance with the principles of the invention for an example opto-electronic device. As shown, a pixel intensity stream containing a complete image frame is collected 162. The average intensity over the frame is calculated 164 and compared 166 to a minimum average intensity threshold $V_{AVG}$. If it is determined 168 that the actual average intensity value is below the minimum average intensity threshold, the shutter open time is increased 176. If not, the maximum intensity value across the entire image is obtained 170. The maximum peak intensity value is compared 172 to a minimum peak intensity level threshold $V_{MIN}$. If it is determined 174 that the maximum peak intensity value is below the minimum peak intensity level threshold $V_{MIN}$, the shutter open time is increased 176. If not, the maximum peak intensity value is compared 178 to a maximum peak intensity level threshold $V_{MAX}$. If it is determined 180 that the maximum peak intensity value is above the maximum peak intensity level threshold, the shutter open time is decreased 182. In this manner, the shutter open time is controlled to allow the optimal exposure time for the most pixels.

Figure 8:
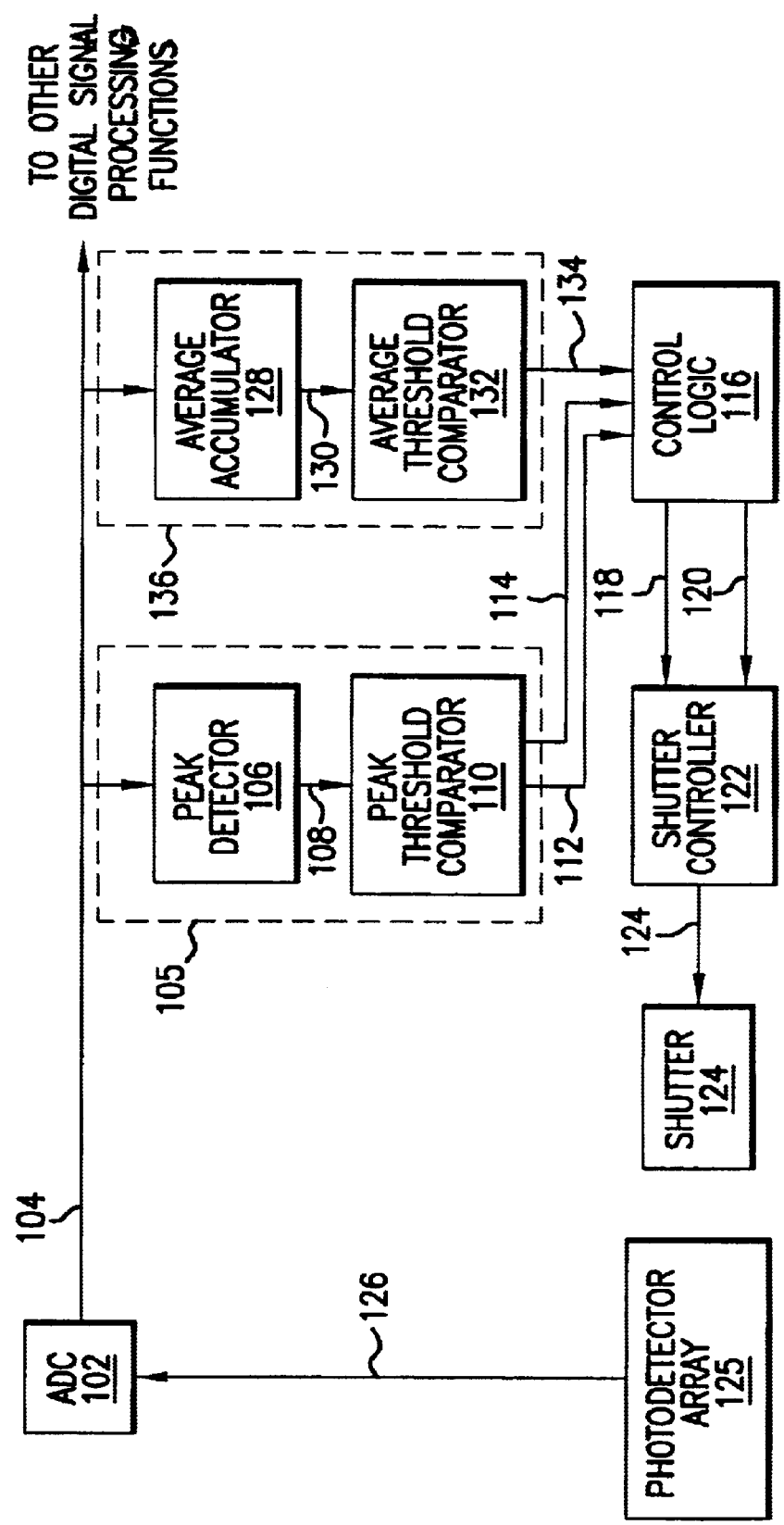
FIG. 8 is a schematic block diagram of an optical device implemented in accordance with the invention.

FIG. 8 is a schematic block diagram of an optical device 100 implemented in accordance with the invention. Device 100 includes photodetector array 110 which senses the intensity level over an array of image pixels (not shown). The pixel intensity levels are converted to a serialized digital pixel stream 104 by an analog-to-digital converter (ADC) 102. An average intensity control circuit 136 receives the pixel stream 104. Average intensity control circuit 136 includes an average accumulator 128 and an average threshold comparator 132. Average accumulator 128 sums the pixel intensity values and outputs the sum on a line 130. Average threshold comparator 132 receives the sum on line 130 and compares the summation value to a predetermined threshold set in accordance with the minimum allowed summation value corresponding to a minimum allowed average intensity threshold. The predetermined threshold is pre-multiplied by the number of pixels per frame. In the alternative, average accumulator 128 also divides the total sum of all the pixel values by the number of pixels to determine the actual average pixel intensity value, which is then output on line 130 and directly compared with the minimum allowed average intensity threshold by comparator 132. Comparator 132 outputs an average threshold compare signal 134 which indicates whether or not the actual average pixel value is below the minimum allowed average intensity threshold.

Figure 4:
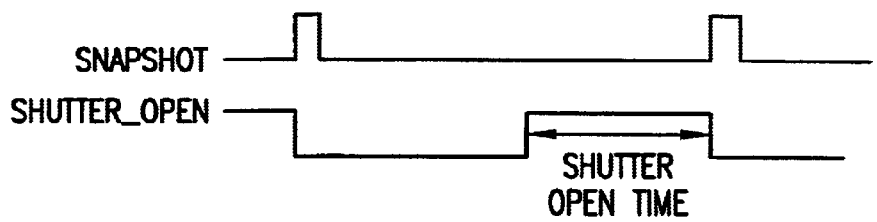
FIG. 4 is a timing diagram illustrating the shutter open time per frame.

A control logic block 116 receives the average threshold compare signal 134 from comparator 132. If the average threshold compare signal 134 indicates that the actual average pixel value is below the minimum allowed average intensity threshold, control logic block 116 increases the pulse width of the shutter open time (see signal SHUTTER_OPEN in FIG. 4). In the illustrative embodiment, this is accomplished by sending an increase pulse width signal 118 to a shutter controller 122. Shutter controller 122 controls the opening and closing of the shutter, and is responsive to signal 118 to increase the current shutter open time. If the average threshold compare signal 134 indicates that the actual average pixel value is within an acceptable range (i.e., it is not below the minimum allowed average intensity threshold), control logic then determines its next action based on input from a peak intensity control circuit 105.

Peak intensity control circuit 105 includes a peak detector 106 and a peak threshold compare circuit 110. Peak detector 106 determines the maximum intensity value 108 over the entire bit stream frame. Peak threshold comparator 110 receives the maximum intensity value 108 and compares it with a minimum allowed peak intensity threshold and with a maximum allowed peak intensity threshold. Comparator 110 outputs a minimum peak threshold compare signal 112 which indicates whether or not the actual maximum intensity value is below the minimum allowed peak intensity threshold, and a maximum peak threshold compare signal 114 which indicates whether or not the actual maximum intensity value is above the maximum allowed peak intensity threshold.

Control logic block 116 receives the minimum and maximum peak threshold compare signals 112 and 114, and adjusts the shutter open time accordingly. Specifically, if the minimum peak threshold compare signal 112 indicates that the actual maximum intensity value is below the minimum allowed peak intensity threshold, control logic block 116 increases the pulse width of the shutter open time by sending an increase pulse width signal 118 to shutter controller 122. If, on the other hand, the maximum peak threshold compare signal 114 indicates that the actual maximum intensity value is above the maximum allowed peak intensity threshold, control logic block 116 decreases the pulse width of the shutter open time by sending a decrease pulse width signal 120 to shutter controller 122. Shutter controller 122 is responsive to signal 120 to decrease the current shutter open time. If together the minimum and maximum peak threshold compare signals 112 and 114 indicate that the actual peak pixel values are within an acceptable range (i.e., they lie between the minimum and maximum peak thresholds), control logic 116 does not perform any adjustment to the current shutter open time.

Figure 1:
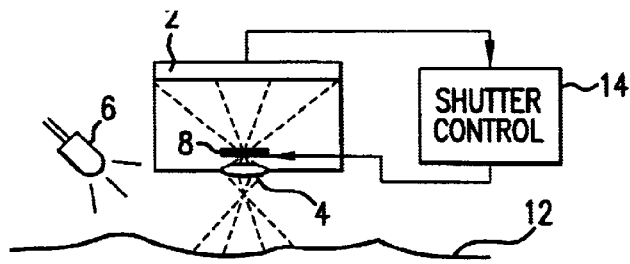
FIG. 1 is a diagram illustrating a typical imaging application which employs an opto-electronic device.
Figure 2:
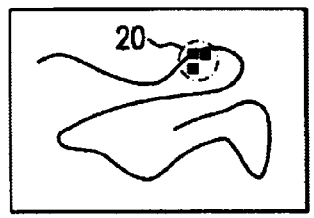
FIG. 2 is an example of a pixel diagram of a shiny image.
Figure 3A:
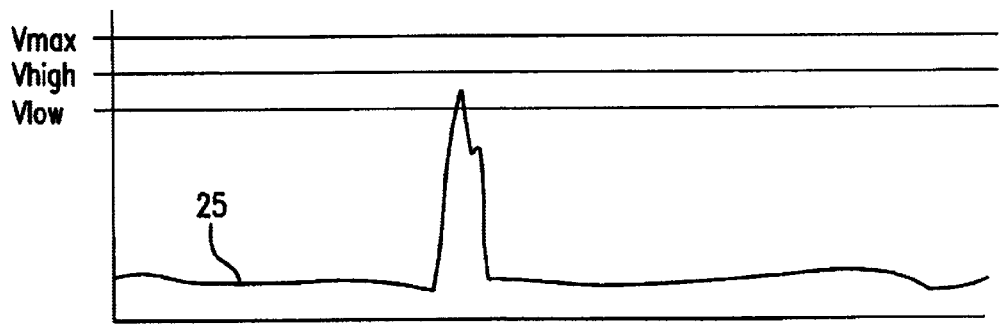
FIG. 3A is a graph of a pixel intensity stream for a single frame of the image of FIG. 2.
Figure 3B:
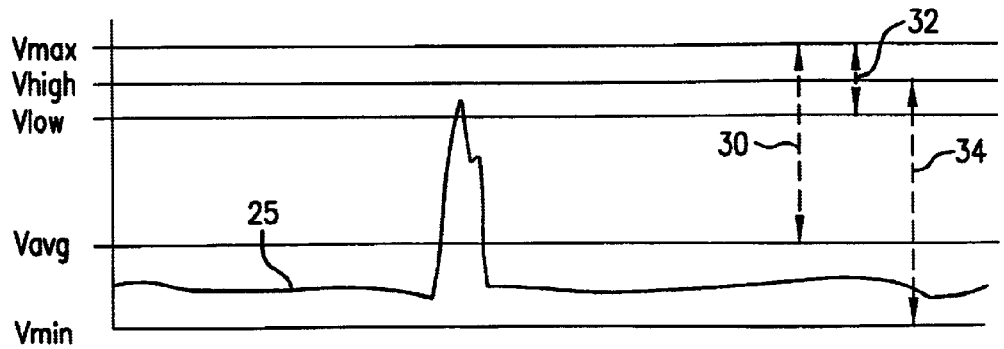
FIG. 3B is a graph of a pixel intensity stream for a single frame of the image of FIG. 2, illustrating the average and peak thresholds used by the method and apparatus of the invention.
Figure 5A:
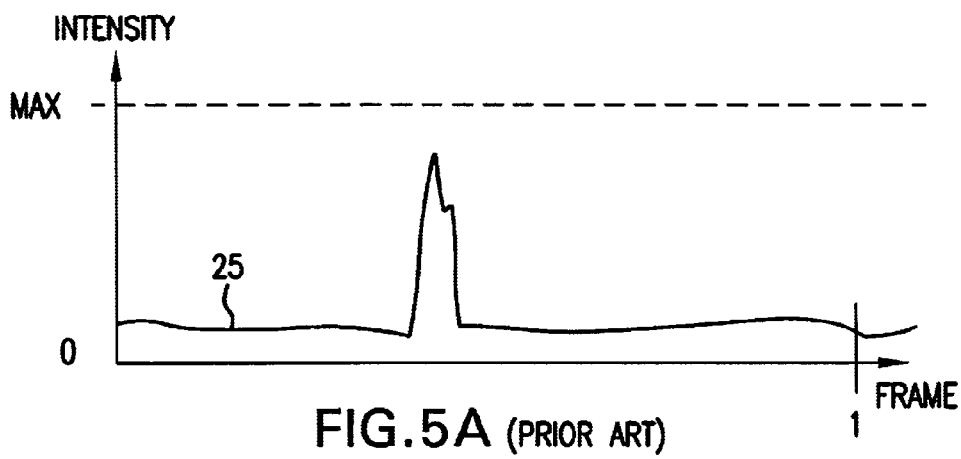
FIG. 5A is a graph illustrating the intensity levels of a normalized pixel stream in the prior art.
Figure 5B:
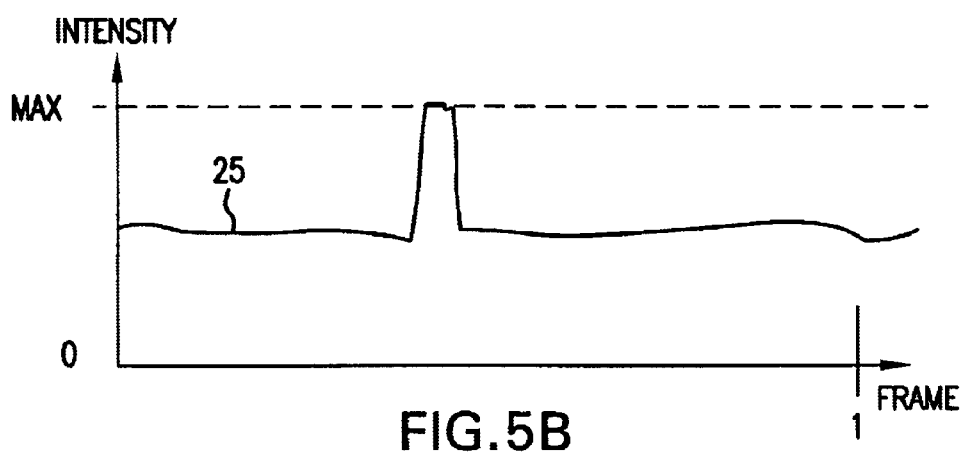
FIG. 5B is a graph illustrating the intensity levels of a normalized pixel stream for a device implemented in accordance with the invention.

FIG. 3B illustrates the average and peak thresholds in relation to the pixel intensity stream for a single frame of the image of FIG. 2. As illustrated, most of the pixels have an average intensity value below the maximum allowed average intensity threshold $V_{AVG}$, while the few bright pixels corresponding to the reflected pixels 20 are above the maximum allowed peak intensity threshold $V_{HIGH}$. An opto-electronic device implemented in accordance with the invention detects that the average pixel intensity lies outside the first intensity range 30 defined by average intensity threshold $V_{AVG}$, and therefore increases the exposure time via the shutter open time to normalize the pixel stream based on the average intensity rather than the peak intensity. The resulting graph illustrating the intensity levels of a normalized pixel stream for a device implemented in accordance with the invention is illustrated in FIG. 5B. As shown, the pixels lying at or near the average intensity threshold are brightened while the very bright pixels 20 are ignored. This allows the information contained in the pixels near or at average intensity to be more accurately detected and processed.

It will be appreciated from the above detailed description that the invention improves over the prior art. The use of multiple thresholds to define different sets of allowed intensity ranges for both average and peak pixel intensities allows the shutter open time to be optimized in a way so as to maximize the average exposure based on the average pixel intensity value while at the same time capturing as much as the image as possible in both the lower and higher intensity ranges. The method is particularly useful in imaging applications in which the image quality is not as critical, such as an optical mouse used for navigation, than in applications in which the image quality is much more critical, such as a TV camera or FAX machine.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for controlling a shutter open time in an opto-electronic device, comprising:

collecting a frame of pixel intensity data;

calculating an average pixel intensity across said frame;

comparing said average pixel intensity to a first threshold;

adjusting said shutter open time in a first direction if said average pixel intensity is outside a first intensity range defined by said first threshold; and if said average pixel intensity is not outside a first intensity range:

detecting a peak pixel intensity;

comparing said peak pixel intensity to a second threshold;

adjusting said shutter open time in said first direction if said peak pixel intensity is outside a second intensity range defined by said second threshold; and if said peak pixel intensity is not outside a second intensity range:
comparing said peak pixel intensity to a third threshold; and
adjusting said shutter open time in a second direction if said peak pixel intensity is outside a third range defined by said third threshold.

2. A method in accordance with claim 1 wherein:
said first threshold is a minimum allowed average intensity level;
said first intensity range comprises average pixel intensity values below said minimum allowed average intensity level; and
said first direction comprises increasing said shutter open time.

3. A method in accordance with claim 2, wherein:
said second threshold is a minimum allowed peak intensity level;
said second intensity range comprises peak pixel intensity values below said minimum allowed peak intensity level; and
said first direction comprises increasing said shutter open time.

4. A method in accordance with claim 3, wherein:
said third threshold is a maximum allowed peak intensity level;
said third intensity range comprises peak pixel intensity values above said maximum allowed peak intensity level; and
said second direction comprises decreasing said shutter open time.

5. A method in accordance with claim 2, wherein:
said first intensity range further comprises said minimum allowed average intensity level.

6. A method in accordance with claim 3, wherein:
said second intensity range further comprises said minimum allowed peak intensity level.

7. A method in accordance with claim 4, wherein:
said third intensity range further comprises said maximum allowed peak intensity level.

8. An apparatus for controlling the shutter open time in an opto-electronic device, said device comprising an illumination source for lighting an image, an optic lens, a photodetector array lying in the image plane of said lens, and an electronic shutter which allows said illuminated image to expose said photodetector array when said shutter is open, comprising:

an average intensity control circuit which receives a frame pixel intensity values, calculates an average intensity value across said frame, compares said average intensity value to a first threshold, and generates a first control signal indicating whether or not said average intensity value is outside a first intensity range defined by said first threshold;

a peak intensity control circuit which receives said frame, determines a peak intensity value across said frame, compares said peak intensity value to a second threshold, and generates a second control signal indicating whether or not said peak intensity value is outside a second intensity range defined by said second threshold; and an intensity control circuit which receives said first controls signal and said second control signal, and which adjusts said shutter open time in a first direction in response to said first control signal if said first control signal indicates that said average intensity value is outside said first intensity range, and which otherwise adjusts said shutter open time in one of either said first direction or a second direction if said second control signal indicates that said peak intensity value is outside said second intensity range.

9. An apparatus in accordance with claim 8, wherein:
said first threshold is a minimum allowed average intensity level;
said first intensity range comprises average pixel intensity values below said minimum allowed average intensity level; and
said first direction comprises increasing said shutter open time.

10. An apparatus in accordance with claim 9, wherein:
said second threshold is a minimum allowed peak intensity level;
said second intensity range comprises peak pixel intensity values below said minimum allowed peak intensity level; and
said first direction comprises increasing said shutter open time.

11. An apparatus in accordance with claim 10, wherein:
said peak intensity control circuit compares said peak intensity value to a third threshold and generates a third control signal indicating whether or not said peak intensity value is outside a third intensity range defined by said third threshold; and
said intensity control circuit which adjusts said shutter open time in the other of said first direction or said second direction if said third control signal indicates that said peak intensity value is outside said third intensity range.

12. An apparatus in accordance with claim 11, wherein:
said third threshold comprises a maximum allowed peak intensity level;
said third intensity range comprises peak,pixel intensity values above said maximum allowed peak intensity level; and
said second direction comprises decreasing said shutter open time.

13. An apparatus in accordance with claim 9, wherein:
said first intensity range further comprises said minimum allowed average intensity level.

14. An apparatus in accordance with claim 10, wherein:
said second intensity range further comprises said minimum allowed peak intensity level.

15. An apparatus in accordance with claim 12, wherein:
said third intensity range further comprises said maximum allowed peak intensity level.

16. An opto-electronic apparatus, comprising:
an illumination source for illuminating an image;
an optic lens;
a photodetector array lying in the image plane of said lens which senses intensity levels of pixels of said image and generates a frame of pixel intensity values;
an electronic shutter which allows said illuminated image to expose said photodetector array when said shutter is open;
an average intensity control circuit which receives said frame of pixel intensity values, calculates an average intensity value across said frame, compares said average intensity value to a first threshold, and generates a first control signal indicating whether or not said average intensity value is outside a first intensity range defined by said first threshold;

a peak intensity control circuit which receives said frame, determines a peak intensity value across said frame, compares said peak intensity value to a second threshold, and generates a second control signal indicating whether or not said peak intensity value is outside a second intensity range defined by said second threshold; and an intensity control circuit which receives said first control signal and said second control signal, and which adjusts said shutter open time in a first direction in response to said first control signal if said first control signal indicates that said average intensity value is outside said first intensity range, and which otherwise adjusts said shutter open time in one of either said first direction or a second direction if said second control signal indicates that said peak intensity value is outside said second intensity range.

17. An apparatus in accordance with claim 16, wherein:

said first threshold is a minimum allowed average intensity level;

said first intensity range comprises average pixel intensity values below said minimum allowed average intensity level; and said first direction comprises increasing said shutter open time.

18. An apparatus in accordance with claim 16, wherein:

said second threshold is a minimum allowed peak intensity level;

said second intensity range comprises peak pixel intensity values below said minimum allowed peak intensity level; and said first direction comprises increasing said shutter open time.

19. An apparatus in accordance with claim 16, wherein:

said peak intensity control circuit compares said peak intensity value to a third threshold and generates a third control signal indicating whether or not said peak intensity value is outside a third intensity range defined by said third threshold; and said intensity control circuit which adjusts said shutter open time in the other of said first direction or said second direction if said third control signal indicates that said peak intensity value is outside said third intensity range.

20. An apparatus in accordance with claim 19 wherein:

said third threshold comprises a maximum allowed peak intensity level;

said third intensity range comprises peak pixel intensity values above said maximum allowed peak intensity level; and said second direction comprises decreasing said shutter open time.

* * * * *